United States Patent [19]

Granz et al.

[11] Patent Number: 4,764,905

[45] Date of Patent: Aug. 16, 1988

[54] ULTRASONIC TRANSDUCER FOR THE DETERMINATION OF THE ACOUSTIC POWER OF A FOCUSED ULTRASONIC FIELD

[75] Inventors: Bernd Granz, Oberasbach; Peter Krämmer; Bertram Sachs, both of Erlangen, all of Fed. Rep. of Germany

[73] Assignee: Siemens Aktiengesellschaft, Munich, Fed. Rep. of Germany

[21] Appl. No.: 940,843

[22] Filed: Dec. 12, 1986

[30] Foreign Application Priority Data

Dec. 20, 1985 [DE] Fed. Rep. of Germany ....... 3545381

[51] Int. Cl.$^4$ .......................................... H04B 17/00
[52] U.S. Cl. .................................... 367/140; 367/150; 367/165; 310/800; 310/335; 73/642
[58] Field of Search ................. 73/607, 618, 622, 627, 73/633, 637, 638, 640, 642, 643, 644, 645, 646; 181/175, 176, 206; 310/335, 345, 337, 357, 367, 371, 800; 367/7, 88, 13, 103, 104, 105, 119, 120, 121, 140, 150, 151, 157, 159, 165, 173, 178, 180, 181

[56] References Cited

U.S. PATENT DOCUMENTS

| | | | |
|---|---|---|---|
| 2,565,159 | 8/1951 | William | 310/371 |
| 3,903,990 | 9/1975 | Tannaka | 73/642 |
| 4,197,921 | 4/1980 | Alphonse et al. | 73/642 X |
| 4,535,630 | 8/1985 | Samodovitz | 73/642 |
| 4,549,107 | 10/1985 | Kaneko et al. | 310/800 |
| 4,556,814 | 12/1985 | Ito et al. | 73/644 X |
| 4,577,132 | 3/1986 | Ohigashi et al. | 310/800 |
| 4,725,989 | 2/1988 | Granz et al. | 367/13 |

FOREIGN PATENT DOCUMENTS

0133665 6/1985 European Pat. Off. .

OTHER PUBLICATIONS

Acustica, Band 58, Sep. 1985, Seiten 215-222, Stuttgart, DE; Muller et al.; "Einsatz einer breitbandigen Piezodrucksonde auf PVDF-Basis zur Untersuchung konvegierender Stosswellen in Wasser".

Ultransonics, May 1980, Seiten 123-126, Guildford, GB; Shotton: "A PVDF Membrane Hydrophone for Operation in the Range 0.5MHz to 15MHz".

Ultrasonics, Sep. 1981, Seiten 213-216, Guildford, GB; Lewin: "Miniature Piezoelectric Polymer Ultrasonic Hydrophone Probes".

Primary Examiner—Deborah L. Kyle
Assistant Examiner—Brian S. Steinberger
Attorney, Agent, or Firm—Kenyon & Kenyon

[57] ABSTRACT

The invention concerns an ultrasonic transducer for the determination of the acoustic power of an ultrasonic field (1) focused at a point (F). According to the invention, an ultrasonic transducer 2 contains a support structure (4) which has the shape of a spherical cup and whose center coincides with the focus (F) of the focused ultrasonic field (1), and a piezoelectric polymer foil (6) equipped on its respective surfaces (62, 64) with a conductive layer (8) is attached to said support structure. These measures ensure that the acoustic charge vibrations within the area formed by the piezoelectric polymer foil (6) are at least approximately in phase and that the respective surface charge vibrations can be measured with the aid of a single, continuous electrode without partial mutual cancellation.

3 Claims, 1 Drawing Sheet

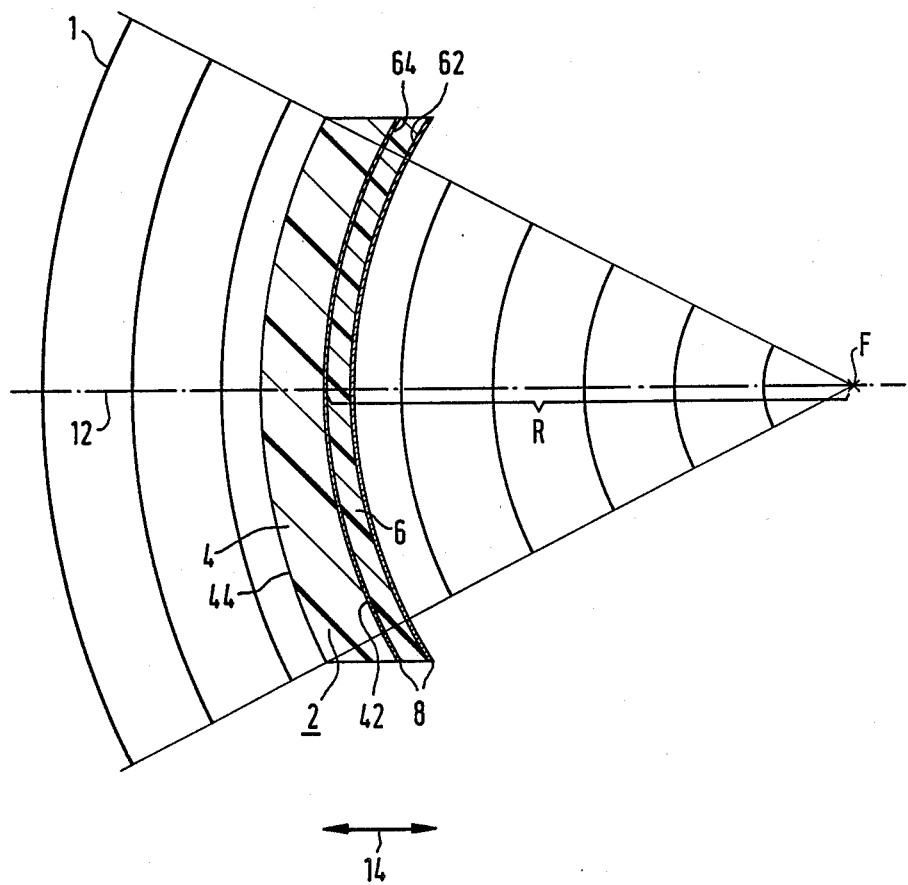

4,764,905

ULTRASONIC TRANSDUCER FOR THE DETERMINATION OF THE ACOUSTIC POWER OF A FOCUSED ULTRASONIC FIELD

BACKGROUND OF THE INVENTION

1. Field of Invention

The present invention pertains to ultrasonic transducer for the determination of the acoustic power of an ultrasonic field focused in a focus.

2. Description of the Prior Art

Focused ultrasonic fields are employed, for example, in medicine, to break up concretions present in the body, e.g. kidney stones. Such procedure is advantageous for the avoidance of surgical interventions including the introduction of probes into the patient's body and for the prevention of dangerous infections.

Equipment for breaking up concretions without direct contact is known from the EP-A2 No. 0 133 665, where the approximately plane ultrasonic wave produced in a shock tube is focused on the target area with an acoustic lens or an acoustic system of lenses. A liquid coupling medium is located between the lens or the system of lenses and a copper membrane serves as an ultrasonic radiator. The shock tube can be aimed at the concretion with the aid of a suitable holder so that the focal point of the lens on the image side lies in the concretion. The lens can also be shifted along the axis of the shock tube with the aid of a fine adjustment means for the exact location of the focal point.

So-called miniature hydrophones are used for measuring an ultrasonic field produced by an ultrasonic radiator in a sound carrying medium, e.g. water. The three-dimensional distribution of the acoustic pressure amplitude of the ultrasonic field produced by the transmitter radiator is determined by measuring the acoustic pressure existing in the measuring tank at various sites with the hydrophone.

If the spatial distribution of the amplitude and the direction of the propagation of the sonic field in a cross-sectional area of the path of rays is known, the flow of energy through this plane can be determine therefrom.

In a known broad-band miniature hydrophone, a piezoactive foil of electrically insulated polyvinylidene fluoride PVDF with a thickness of 25 $\mu m$ (micrometers) and equipped with electrodes is stretched across the front area of a refined steel tube. The diameter of the foil is about 1 mm. A platinum wire that is connected to a coaxial cable is located on the inside of the foil. This platinum wire is supported by a backing with which the inside of the refined steel tube is filled. The outside of the foil is in electrical contact with the refined steel tube. The outside of the foil is in electrical contact with the refined steel tube and connected to the shielding of the coaxial cable (Ultrasonics, September 1981, pp. 213 to 216).

Also known is a membrane hydrophone (Ultrasonics, May 1980, pp. 123 to 126), in which a polyvinylidene fluoride PVDF membrane with a thickness of 25 $\mu m$ and a diameter of 100 mm is stretched between two metal rings. In the center of the membrane there is the piezoelectrically active area, which is equipped with electrodes and has a diameter of 4 mm, for example.

Several mutually independent measurements must be made in a cross-sectional area of the path of rays to determine the acoustic power of a focused ultrasonic field with the aid of such hydrophones. This can be accomplished, e.g., by performing several sequential measurements with one hydrophone. But such a procedure is time consumming and cannot be performed, for example, during the use of a medical ultrasonic device, such as a lithotripter. The time expended for the measurement can be reduced when a several hydrophones are arranged in the cross-sectional area that can be read approximately simultaneously, but this requires large structural expenses. Besides, the interferences associated with the ultrasonic field in this type of structure are not negligible.

SUMMARY OF THE INVENTION

The objective of the invention therefore is to provide a device for measuring the acoustic power of a focused ultrasonic field that can be used outside the focus point even during the ultrasonic treatment of an object and in which the entire cross-sectional area of the path of rays of the ultrasonic field is completely covered with a single ultrasonic transducer.

This objective is accomplished by providing a transducer having a special support and a piezoelectric polymer foil attached to the support. The radius of curvature of the piezoelectric polymer foil is at least approximately equal to its distance from the focus of the ultrasonic field. The curved shape of the piezoelectric polymer foil is obtained by applying it to the curved, mechanically stable support structure. The ultrasonic vibrations are thus at least approximately in phase within the area defined by the piezoelectric polymer foil and the corresponding surface charge vibrations can be added without partial, mutual cancellation. The addition is accomplished by equipping the piezoelectric polymer foil on its two flat sides with one continuous, electrically conductive layer, respectively. The total alternating charge amplitude is proportional to the mean square of the acoustic pressure and therefore to the mean square of the alternating charge amplitude. The sensitive area of the ultrasonic transducer is preferably selected to be larger than the aperture of the ultrasonic filed at the site of the ultrasonic transducer, to accept the total acoustic power of the ultrasonic field.

In an advantageous embodiment of the invention, the support consists of a plastic, for example polystyrene PS. The acoustic impedance of the support structure is then largely adjusted to the acoustic impedance of the sound-carrying medium, for example water or a liquid similar to water, and the reflection losses are decreased.

In a preferred embodiment, the piezoelectric polymer foil consists of polarized polyvinylidene fluoride PVDF and is equipped on it surface facing the support structure and on its free surface with an electrically conductive, for example metallic, layer.

BRIEF DESCRIPTION OF THE DRAWING

For further explanation of the invention, reference is made to the drawing, which shows the arrangement of an ultrasonic transducer according to the invention in a focused ultrasonic field in a sectional view.

DETAILED DESCRIPTION OF THE INVENTION

According to the FIGURE, an ultrasonic field 1 is focused at focal point F. The ultrasonic field 1 has the shape of a spherical wave, the center of the wave coinciding with the point F. The ultrasonic field 1 is focused, for example, with acoustic lens or reflector systems not shown in the FIGURE. In the ultrasonic field 1 there is an ultrasonic transducer 2, which includes a support structure 4 on which a piezoelectric polymer foil 6 is arranged at least indirectly on one surface 42 facing, e.g., the focal point F. The piezoelectric polymer foil 6 preferably consists of polarized polyvinylidene fluoride PVDF. The ultrasonic transducer 2 has a rotational or spherical symmetrical configuration about the axis of symmetry 12 and is arranged in the ultrasonic field 1 in such a way that focal point F of ultrasonic field 1 lies on the axis of symmetry 12. The support structure 4 has the shape of a spherical cup, the geometric center of the cup coinciding with focal point F. The radii of curvature of surface 42 and of surface 44 of the support structure facing away from the point F are therefore at least approximately equal to the distance of these surfaces 42 and 44 from the point F. This ensures a match in the phase of ultrasonic field 1 within the areas defined by these surfaces 42 and 44. Piezoelectric polymer foil 6 is equipped on its free surface 62 and the surface 64 facing support structure 4 with respective electrically conductive layers 8, which are connected to electric connecting leads not shown in the FIGURE. The alternating charges originating at surfaces 62 and 64 of piezoactive polymer foil 6 thus are also in phase and are not mutually cancelled. The correct position of ultrasonic transducer 2 can be determined, for example, by moving it radially in the directions marked with a double arrow 14 until the maximal alternating charge amplitude is measured. This position identifies the location where the distance R of ultrasonic transducer 2 from focal point F is at least approximately equal to the radius of curvature of the piezoelectric polymer foil 6 and the alternating charge signals produced in the various areas of surfaces 62 and 64 of the piezoelectric polymer foil are at least approximately in phase.

What is claimed is:

1. An ultrasonic transducer (2) for measuring the acoustic power of a spherical ultrasonic field (1) focused at a focal point F, comprising a plastic support structure (4) that has a shape of a spherical cup with a geometric center, and two opposed spherical surfaces; and a piezoelectric polymer foil arranged at least indirectly on one of said spherical surfaces, the piezoelectric polymer foil having two conductive layers.

2. The ultrasonic transducer according to claim 1, wherein said support structure consists of a polystyrene PS.

3. The ultrasonic transducer according to claim 1, wherein said piezoelectric polymer foil consists of a polarized polyvinylidene fluoride PVDF.

* * * * *